United States Patent
Hall et al.

(10) Patent No.: US 7,509,433 B1
(45) Date of Patent: Mar. 24, 2009

(54) SELECTING QUICK-TO-DOWNLOAD CONTENT THROUGH AN ALTERNATIVE HYPERTEXT PROTOCOL

(75) Inventors: Andrew J. Hall, Basingstoke (GB); Brian D. Peacock, North Baddesley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/123,077

(22) Filed: May 19, 2008

(51) Int. Cl.
    *G06F 15/16* (2006.01)
(52) U.S. Cl. .................................................. 709/232
(58) Field of Classification Search ............... 709/217, 709/230, 232
    See application file for complete search history.

(56) References Cited

U.S. PATENT DOCUMENTS

| | | | |
|---|---|---|---|
| 6,076,109 A * | 6/2000 | Kikinis ................ | 709/228 |
| 6,456,308 B1 | 9/2002 | Agranat et al. | |
| 6,836,806 B1 * | 12/2004 | Raciborski et al. ........ | 709/245 |
| 2001/0047421 A1 | 11/2001 | Sridhar et al. | |
| 2004/0049598 A1 | 3/2004 | Tucker et al. | |
| 2008/0250484 A1 * | 10/2008 | Chong et al. ............... | 726/7 |

OTHER PUBLICATIONS

Smith, S.E., "What is the Difference Between http and https?", 2007, Conjecture Corporation, http://www.wisegeek.com/what-is-the-difference-between-http-and-https.htm.*

"Wireless Markup Language" from Wikipedia, the free encyclopedia, 2 pages, May 2, 2008.
HTML 4 Specification: "13 Objects, Images, and Applets," 17 pages, Dec. 1999.
"Hypertext Transfer Protocol—HTTP/1.1", 28 pages, 1999.
"What is progressive JPEG?", 2 pages, May 13, 2007.

* cited by examiner

*Primary Examiner*—Jason D Cardone
*Assistant Examiner*—Brian J Gillis
(74) *Attorney, Agent, or Firm*—Oppenheimer Wolff & Donnelly LLP

(57) ABSTRACT

One aspect of the present invention provides a alternative hypertext protocol to enable the selection of quick-to-download/reduced content from a website. In one embodiment, this alternative hypertext protocol uses the same structure as HTTP, but contains a unique predefined Uniform Resource Identifier (URI) scheme for easy designation by clients. On the web server, content is defined for HTTP connections and a quick-to-download version of this content is defined for alternative hypertext protocol connections. The HTTP content is made available on a first port on the web server, and the quick-to-download alternative hypertext protocol content is made available on a second port on the web server. To access the quick-to-download content, an internet connection is established to the second port of the web server using the alternative hypertext protocol. Once a connection is established to the second port, the web server transmits the quick-to-download content via the alternative hypertext protocol.

1 Claim, 2 Drawing Sheets

SELECTING QUICK-TO-DOWNLOAD CONTENT THROUGH AN ALTERNATIVE HYPERTEXT PROTOCOL

FIELD OF THE INVENTION

The present invention generally relates to the use of communication protocols over a computer network. The present invention more specifically relates to a protocol used to deliver quick-to-download content to web browsers over the internet.

BACKGROUND OF THE INVENTION

Web content is getting progressively more elaborate with increased amounts of images, videos, and other multimedia content. Although computers are getting faster and broadband usage is increasingly widespread, increased multimedia content means that websites are taking longer to load than ever before. The amount of data required to convey the useful information on any given page is typically several orders of magnitude less than the data required to supply all the images, scripts, stylesheets, and multimedia elements that surround it. The problem then is how to only request the minimum amount data from a web server to convey the essential information from that page.

Various methods exist in the art to obtain a smaller version of a requested webpage. One workaround is that pages have a "no-images" or "mobile-edition" version that contains the same content presented with minimal graphical frills. The key problem with this approach is that each no-images or mobile edition is specific to the website, and must be specifically defined and presented by the web server—there is no generic solution that can be adopted across disparate websites.

Technologies like WAP and WML (Wireless Application Protocol/Wireless Markup Language) also exist to provide an entire design methodology tailored to low-bandwidth web-browsing. The key disadvantage is they require significant investment to apply, since WAP is a specialized protocol and WML is a different markup language unsupported by major browsers. Also, the use of WAP and WML requires special authoring from the web site developer. Further, WAP/WML is designed for small screens, such as mobile devices, and is not easily ported to large screens on the end of congested connections.

Additionally, some web browsers have the ability to ignore content that comes from particular sites or block specific items such as advertisements from loading within a displayed webpage. However, these workarounds do not distinguish between more important and less important information on a webpage because the browser simply blocks or ignores an entire media type, and all of the content on the page is still downloaded by many of the users.

BRIEF SUMMARY OF THE INVENTION

One aspect of the present invention is to introduce a new hypertext protocol to enable the selection of quick-to-download/reduced content from a website. In use, this new protocol delivers modified content for a request of a webpage, although it does not necessarily change the means of transmitting the webpage content. Thus, the website structure remains the same, but the content sent in response to the webpage request varies depending on the protocol it is requested with.

In one embodiment of the present invention, an alternative hypertext protocol is defined based on the standards provided within the Hypertext Transfer Protocol (HTTP). This alternative hypertext protocol uses the same standardized messages and data structures as HTTP, but contains a unique predefined Uniform Resource Identifier (URI) scheme (i.e., has a distinct the portion of each URL that is signified for HTTP by the "http" portion of "http://www.website.com").

On the web server, content is defined to be delivered via normal HTTP connections. A subset of this content is then defined on the web server as quick-to-download content to be delivered via the alternative hypertext protocol. The quick-to-download content contains a minimized version of the content with less multimedia features and only the necessary data. The HTTP content is made available on a first port on the web server, and the quick-to-download alternative hypertext protocol content is made available on a second port on the web server. Accordingly, the web server is able to serve web pages via HTTP and alternative hypertext protocol connections.

To access the quick-to-download content, an internet connection is established on the second port of the web server in response to receiving a request for data via the alternative hypertext protocol. The client computer signifies the use of the alternative hypertext protocol by using an URI address containing the unique predefined URI scheme of the alternative hypertext protocol. Accordingly, once a connection is established to the second port of the web server, the web server transmits the quick-to-download content via the alternative hypertext protocol.

DETAILED DESCRIPTION OF THE INVENTION

One aspect of the present invention introduces a unique way to signal to a web server that reduced bandwidth content is requested by the user browsing the website. In one embodiment of the present invention, an alternative hypertext protocol is defined to provide quick-to-download or reduced content when accessed, in contrast to the full content which is offered via a standard hypertext protocol connection. In one embodiment, this alternative hypertext protocol is named "HTTPQ" for "HTTP Quick".

In a further embodiment of the present invention, for any given URI (Uniform Resource Identifier) of a website, such as http://www.somesite.com/directory/webpage.html, a user could request the "quick to download" or "reduced content" version by simply changing the protocol, i.e., changing the website address being accessed, to httpq://www.somesite.com/directory/webpage.html. The actual name or acronym of the protocol is arbitrary, but is disclosed herein as "HTTPQ" to represent HTTP "quick". In technical terms, to access the quick-to-download/reduced content version, the user will specify the HTTPQ URI scheme in place of the HTTP URI scheme within the URI being accessed.

Additionally, the structure of the alternative hypertext protocol could be identical to that used for the base protocol, in this case HTTP, or a variant of HTTP designed to reduce bandwidth usage. Thus, in one embodiment, the structure of the alternative hypertext protocol messages are identical to the messages used within HTTP in order to enable web page rendering by standard web browsers.

The present invention is distinguishable from removing images from a page or simply turning off images in a browser, as an image may actually be a critical part of the content of that page. Rather, the present invention provides a method of gaining access to the quick-to-download core content of a page in a speedy fashion with a simple way of switching to the full content. Similarly, the present invention is distinguishable from browsers which download web pages incrementally, because the entire content is downloaded and immediately displayed.

Advantages of the present invention include that the user does not need to know anything about the website structure or content to obtain the reduced content and use the alternative hypertext protocol. Additionally, the method of switching between the normal content and reduced content is simple and easy to remember. To access the reduced content, the user simply needs to specify the correct URL containing "HTTPQ" when accessing the website. Similarly, the user can easily switch between the "full page content" and the "quick to download" content by only changing the protocol portion of the URL, as the rest of the URL would remain identical.

Figure 1:
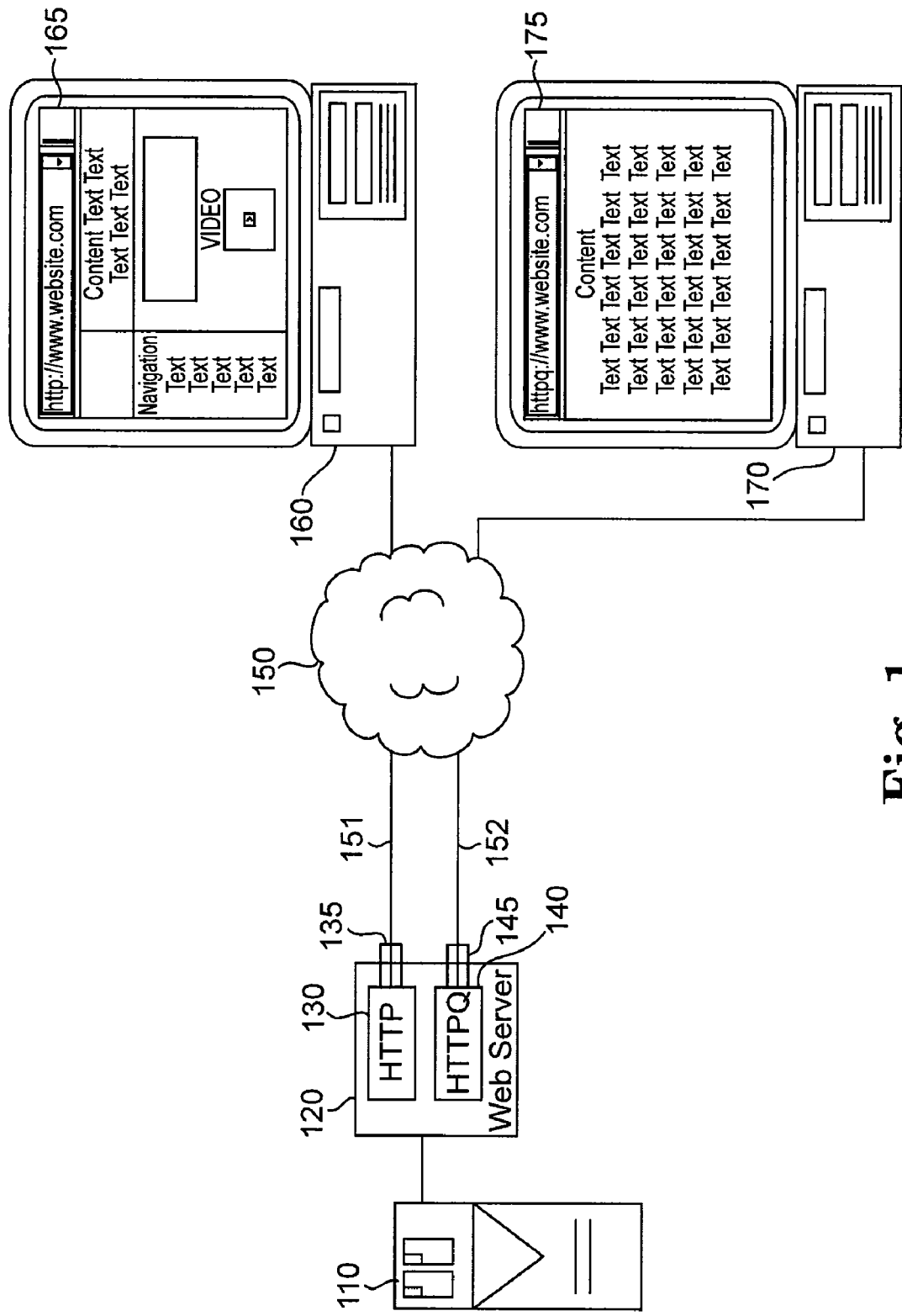
FIG. 1 illustrates an exemplary operational environment for one embodiment of the present invention.

FIG. 1 illustrates an exemplary operational environment for one embodiment of the present invention. A computer 110 operates a web server 120 such as Apache or an equivalent web server to serve web pages. The web server 120 contains support to serve content of pages accessed via the HTTP protocol 130 over port 80 135, in addition to support for serving content of pages accessed via the new HTTPQ protocol 140 via another defined port, such as port 81 145. The web server 120 is accordingly connected to the internet 150.

As is depicted in FIG. 1, when a remote computer 160 accesses the web server 120 via the internet 150, a connection 151 is created to HTTP port 80 135. The content downloaded from the web server 120 is displayed via the browser 165. In a standard configuration, the content downloaded is the full version of the web page and contains full multimedia content.

The connection via HTTPQ is similar to the connection via HTTP within FIG. 1. As is depicted, remote computer 170 accesses the web server 120 via the internet, and a connection 152 is created to HTTPQ port 81 145. Accordingly, the quick-to-download content from the web server 120 is displayed via the browser 175. As is shown, the same address on the web server is accessed, but only the quick-to-download critical content is delivered to the browser 175, which accordingly contains far less multimedia content. The only modification needed to the browser 175 is to know which port is associated with the HTTPQ protocol, which may be defined according to a RFC standard or other industry-defined standard, or may be defined by the user in the URL such as httpq://www.somesite.com:81/directory/webpage.html.

One skilled in the art would realize that the choice of ports for the HTTP and HTTPQ protocols described above is an example, as other suitable ports may be chosen. Additionally, if no HTTPQ content is defined on the web server, the HTTPQ port could be mapped to the HTTP port to provide the same content when accessed by either HTTP and HTTPQ.

In one embodiment of the present invention, even though the HTTPQ protocol is structured the same as HTTP, different content is being delivered via the protocol. The only modification needed on the web server is use of the HTTPQ protocol on a defined port, and the delivery of specific content in response to receiving a HTTPQ request. Accordingly, in one embodiment, the structure of the HTTP and HTTPQ protocol data is identical, but these protocols simply request different content. In contrast, other protocols which deliver reduced content such as WAP use different protocol stacks and data structures within the protocol.

One example of the use of the present invention involves delivery of web page content from content management systems such as knowledge bases. For example, in the version of the webpage accessible over HTTP, full frames, navigation utilities, and a number of dynamic content fields may appear, and only a small portion of the downloaded content may display the actual useful information from the knowledge base. Thus, in the HTTPQ version of the page, only the useful knowledge base content will be rendered without frames, and the remainder of the dynamic content and navigation utilities will not be included.

To properly implement delivery of HTTPQ content, the web developer or content owner will need to define which content is quick-to-download on the web server. However, if the web server does not contain any specific defined quick-to-download content, then the web server may be configured to provide standard HTTP content when HTTPQ content is requested. In one configuration, this may be accomplished by having the HTTPQ and HTTP protocols mapped to the same port on the web server.

Figure 2:
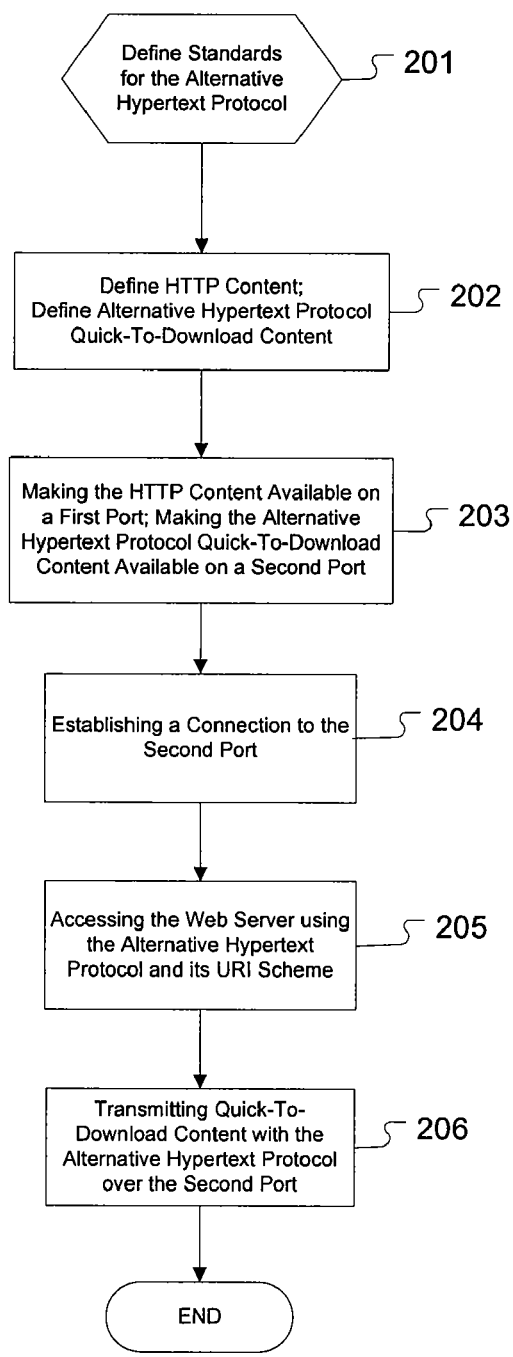
FIG. 2 illustrates an exemplary operation of the method for selecting quick-to-download content through an alternative hypertext protocol in accordance with one embodiment of the present invention.

FIG. 2 illustrates an exemplary operation of the method for selecting quick-to-download content through an alternative hypertext protocol in accordance with one embodiment of the present invention. The preliminary step as in 201 is to define standards for the alternative hypertext protocol. In one embodiment, the alternative hypertext protocol is based substantially from Hypertext Transfer Protocol (HTTP) standards, and accordingly uses the same request and response messages when sending and receiving data. This enables standard web browsers or other applications to easily communicate with the alternative protocol. The alternative hypertext protocol, however, contains a predefined Uniform Resource Identifier (URI) scheme distinct from HTTP.

Next, as in 202, content is defined to be provided on an internet-connected web server through HTTP, and quick-to-download content is defined to be provided on the web server through the alternative hypertext protocol. As detailed above, the quick-to-download content contains a subset of the content provided via HTTP, but presented in a quick-to-download format without unnecessary text and multimedia features. As in 203, The HTTP content is made available via connections to a first port on the web server, and alternative hypertext protocol content is made available via connections to a second port on the web server.

When the quick-to-download content is requested by a client computer, a connection is established to the second port as in 204. The client computer is accordingly able to access the quick-to-download content on the web server via the alternative hypertext protocol by specifying an URI address containing the URI scheme of the alternative hypertext protocol as in 205. Finally, the quick-to-download content is transmitted using the alternative hypertext protocol over the second port as in 206.

Although the "HTTPQ" protocol referenced herein is described as an embodiment of the present invention, there are alternative embodiments which would effectively communicate a similar request for reduced bandwidth content to the server. In one embodiment, the actual data protocol could be the same or very similar to HTTP, to minimize the necessary changes to allow web browsers to support it. Additionally, slight modifications may be made in the request for quick-to-download content from the web server. For example, a browser could send a specific User-Agent header, or could even employ a custom HTTP header.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for selecting quick-to-download content through an alternative hypertext protocol, comprising:

defining standards for an alternative hypertext protocol, wherein the alternative hypertext protocol standards are identical to Hypertext Transfer Protocol (HTTP) standards but with use of a unique predefined Uniform Resource Identifier (URI) scheme;

defining, on a web server connected to the internet, content on a web server to be delivered via HTTP, the web server being configured to establish HTTP connections through a first port and to establish alternative hypertext protocol connections through a second port;

defining quick-to-download content on the web server to be delivered via the alternative hypertext protocol, wherein the quick-to-download content contains a subset of the content to be delivered via HTTP;

making available the content on the first port of the web server through HTTP;

making available the quick-to-download content on the second port of the web server through the alternative hypertext protocol;

establishing an internet connection on the second port of the web server responsive to the web server receiving a request for data with the alternative hypertext protocol from a client, the alternative hypertext protocol request initiated by the client through use of an URI address containing the unique predefined URI scheme of the alternative hypertext protocol; and transferring from the web server the quick-to-download content via the alternative hypertext protocol through the internet connection on the second port of the web server.

* * * * *